April 23, 1929.   O. OHLSON   1,710,237
FLEXIBLE SHAFT
Filed June 9, 1926
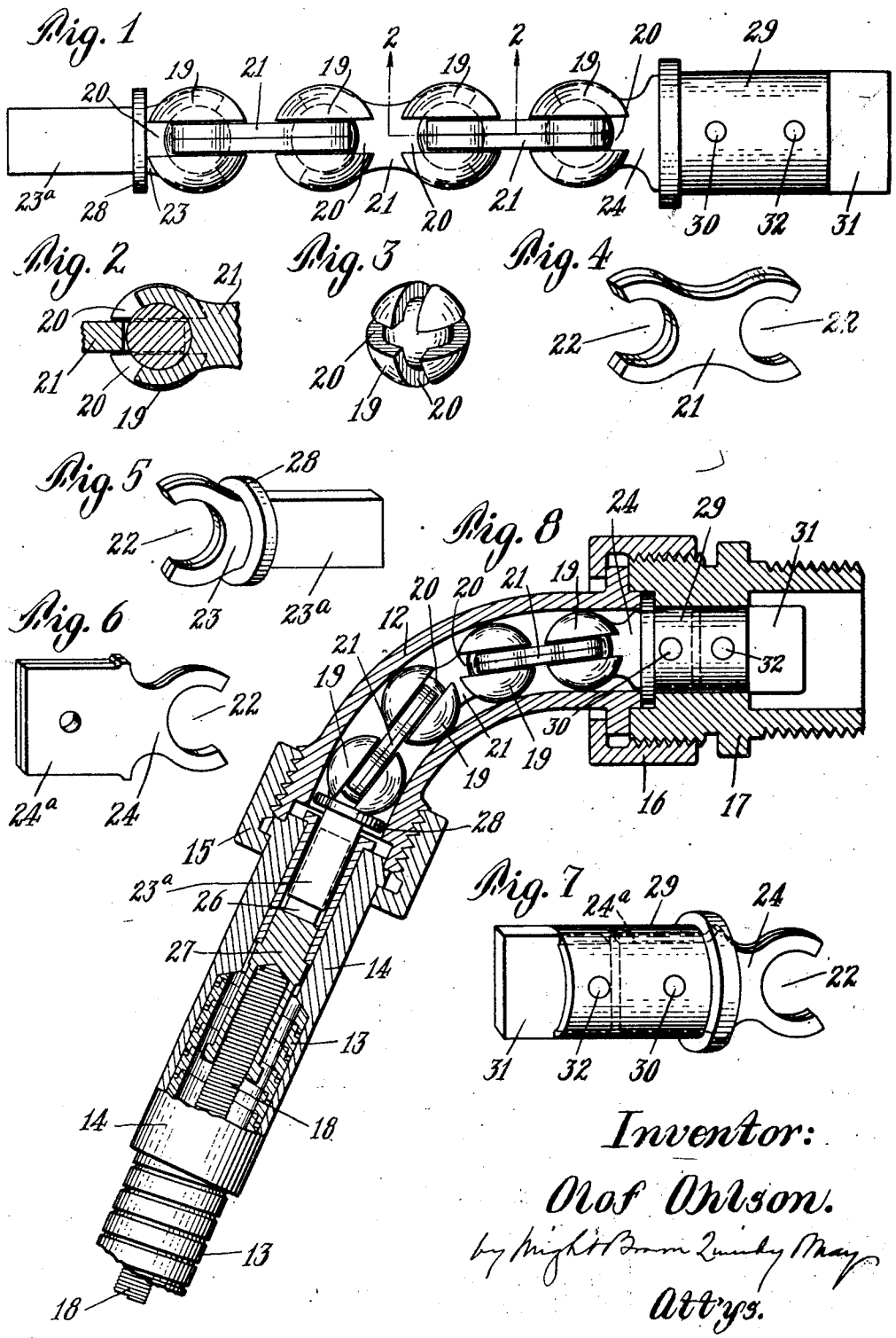
Inventor:
Olof Ohlson.

Patented Apr. 23, 1929.

1,710,237

UNITED STATES PATENT OFFICE.

OLOF OHLSON, OF NEWTON, MASSACHUSETTS, ASSIGNOR TO WALTHAM WATCH COMPANY, OF WALTHAM, MASSACHUSETTS, A CORPORATION OF MASSACHUSETTS.

FLEXIBLE SHAFT.

Application filed June 9, 1926. Serial No. 114,655.

This invention relates to a flexible shaft, adapted to drive mechanism such as that of a motor-vehicle speedometer, the shaft in the preferred embodiment of the invention, including a tubular casing or conduit, composed of a flexible major portion extending from the source of power, and a rigid curved or elbow-shaped minor portion, constituting an angle joint, connected with a fixed element of a speedometer, and flexible torque-transmitting means enclosed in, and adapted to turn in the casing. This embodiment of the invention relates particularly to the rigid portion of the casing or conduit, and to the portion of the torque-transmitting element enclosed therein, and conforming to the curvature thereof. The object is to furnish an angle joint for transmission shafts of a character such that it will not lock or bind but will run smoothly and with freedom from noise; and at the same time can be made at small expense.

Of the accompanying drawings forming a part of this specification—

Figure 1 is a side view, showing in straightened form, the portion of the torque-transmitting element which is enclosed in the curved rigid portion of the casing or conduit.

Figure 2 is a fragmentary section on line 2—2 of Figure 1.

Figure 3 shows in perspective one of the balls shown by Figures 1 and 2.

Figure 4 shows in perspective one of the connecting links, shown by Figure 1.

Figures 5 and 6 show in perspective the two terminal links, shown by Figure 1.

Figure 7 shows in perspective the coupling member hereinafter described, associated with one of the terminal links.

Figure 8 shows partly in side elevation, and partly in end elevation, a flexible shaft constituting the preferred embodiment of the invention, an end portion of the shaft being broken away.

Figures 1 to 7 of the drawings filed with this specification are enlarged to three times the actual size of the parts shown thereby. Figure 8 is enlarged to twice the actual size of the parts shown thereby.

The same reference characters indicate the same parts in all of the figures.

The casing or conduit element of a flexible shaft embodying the invention may comprise a curved rigid tubular section 12, constituting a minor portion of the length of the conduit, and a flexible tubular section 13, constituting the major portion of the length of the conduit. The section 12 may be a curved or elbow-shaped length of metal tubing, and the section 13 may include helically wound strips constituting the body portion of the section and a metallic end portion 14, coupled by a union nut 15 to one end of the section 12, the opposite end of the latter being coupled by a union nut 16 to a member 17, adapted for connection with the casing of a speedometer. In this instance, the torque-transmitting element associated with the casing, includes two portions, one of which may be a length 18 of flexible shafting, as ordinarily constructed, located in the casing section 13.

The other portion of the torque-transmitting element, constructed in accordance with my invention, and located in the rigid section 12, comprises a series of balls 19, each having two intersecting peripheral grooves 20 in great circle planes at right angles to each other, whose bottoms form reduced peripheral zones of smaller diameter than the balls, and whose sides form link abutments, ball-connecting links 21, each having two bifurcated ends forming sockets 22, and terminal links 23 and 24, each having a single bifurcated end forming a socket 22.

The sockets of the several links are adapted to turn on the reduced zones of the balls, to permit flexure of the torque-transmitting element portion formed by the balls and links. The sides of the several links abut the sides of the grooves 20, to cause torque transmission. The diameter of the balls is such that they are adapted to turn freely in the bore of the casing section 12. The bifurcations forming the sockets 22 are preferably resilient, and are formed to embrace slightly more than one-half of the diameter of the reduced zones. In assembling the balls and links the bifurcations of the links are forced on to the reduced zones of the balls, the free ends of the bifurcations being first sprung outward by the wedging effect of the groove bottoms, and then caused by their resilience to spring inward after passing the widest parts of the balls, so that, as best shown by Figure 2, the links have a coupling engagement with the zones embraced thereby, whereby the balls and links are prevented from separation from each other by a moderate longitudinal strain tending to pull them apart. The balls and links may, therefore, be quickly and conveniently coupled together, so that they are inseparable by ordinary usage. The links may be punched from flat metal sheets or plates, and, preferably, each link is composed of two such punchings placed side by side.

These punchings have the characteristic common to all sheet metal punchings of being smoothly rounded on the edges at one side and having slight burrs on the edges at the opposite side. That is, the edges of one side of the punching are blunt, smooth and somewhat rounded, while those at the opposite side are sharp and somewhat rough. Advantage is taken of this characteristic in sheet metal punchings to provide without additional cost links which are smooth on the edges where they make contact with the bottoms and sides of the grooves in the balls, by making each link of two punchings, each having half the thickness of the complete link, and assembling the punchings with their burred or sharp edges next to one another, whereby the blunt and rounded edges only are exposed on the outer sides of the composite link and bear on the adjacent surfaces of the ball which is embraced by the jaws of the link. This composite structure also leaves the jaws of each piece less rigid than would be the case if the link were made of a single piece, and makes it easier to spring the jaws over the balls.

The terminal links 23 and 24 are provided with coupling members, adapted for engagement with complemental coupling members, one connected with the shaft section 18, and the other with the speedometer or other mechanism to be driven by the shaft. As shown by Figures 5 and 8, the coupling member on the terminal link 23 is an extension 23ª of said link, forming a tongue adapted to enter a slot 26 (Figure 8) in a member 27, rotatively mounted in the end portion 14, and engaged with the flexible shaft section 18, to turn therewith. These terminal links are likewise each made of two punchings assembled in the same way as described with reference to the links 21.

The slotted member 27 constitutes a coupling member complemental to the member 23ª. A ring 28 may be fixed to the coupling member 23ª in position to bear on the ball 19, at one end of the series. The terminal link 24 may be provided with an extension 24ª inserted in a tubular member 29, and secured thereto by a pin 30. A tongue 31 is fixed by a pin 32 to the member 29, and projects therefrom to engage a slot in a coupling member (not shown) associated with the mechanism to be driven, the tongue 31, secured, as described, to the terminal link constituting a complemental coupling member.

It will be seen that the torque-transmitting element portion composed of the balls and links, is adapted to assume any curvature required by the curvature of the rigid casing portion 12, and is freely rotatable in said casing portion.

The rounded edges of the links cause them to engage smoothly with the balls and avoids cutting or scoring of the balls by the burrs or sharp edges thereof.

The angle joint made as described operates with the minimum of frictional resistance and wear. The balls bear on the inner surfaces of the curved housing section 12, which housing may be packed with a semi-fluid lubricant. Capillary attraction tends to retain the lubricant in the grooves of the balls between the walls of such grooves and the jaws of the links. The moving parts are virtually noiseless, a prime consideration, particularly in driving means for an automobile speedometer. In this situation noise is very noticeable and very objectionable. At the same time the angle joint is of the utmost simplicity and can be made at a minimum of cost for material and labor.

I do not limit myself, however, to a torque-transmitting element characterized as stated, which is shorter than the casing and is coupled to another transmitting element, such as the element 18. If desired, the transmitting element composed of grooved balls and links, assembled as described, may be practically coextensive in length with the casing, the latter being formed to support and permit the rotation of the balls.

I claim:

1. An angle joint for power transmission shafting comprising a curved tubular section, a series of balls fitting rotatably within said section, and each having intersecting grooves in two great circle planes at right angles to each other, and connecting links engaged with said balls consisting of two similar sheet metal punchings placed side by side with their burred edges next to one another and formed at the end with jaws shaped to embrace more than half the circumference of the grooved zone of a ball, the extremities of said jaws being nearer together than the diameter of the bottom of the groove and the jaws having sufficient resilience to enable them to be sprung over the grooved zone.

2. The combination of a curved shaft housing and a flexible shaft therein comprising a series of balls fitted to rotate within and have bearing on the inner walls of said housing, and links extending between said balls and engaged therewith; the balls each having two intersecting grooves in great circle planes at right angles to each other, and the links being each of composite structure formed of two punchings of sheet metal placed together flatwise with the burred edges thereof adjacent to one another and formed with jaws at their ends to embrace and clasp the zones of adjacent balls, such jaws embracing more than half the circumference of the zones and their extremities being nearer together than the diameter of the zone so embraced, and being sufficiently rigid to prevent withdrawal from the balls in the circumstances of use; the link at the end of said shaft having at one end a jaw characterized as set forth and at the other end a tongue portion.

In testimony whereof I have affixed my signature.

OLOF OHLSON.